(No Model.) 2 Sheets—Sheet 1.

E. D. TAYLOR.
MANUFACTURE OF TRUNKS, &c.

No. 476,840. Patented June 14, 1892.

(No Model.) 2 Sheets—Sheet 2.

E. D. TAYLOR.
MANUFACTURE OF TRUNKS, &c.

No. 476,840. Patented June 14, 1892.

Witnesses
F. J. Benjamin.
S. Brashears

Inventor:—
Esau D. Taylor,
by H. N. Low
atty.

THE NORRIS PETERS CO., PHOTO-LITHO., WASHINGTON, D. C.

UNITED STATES PATENT OFFICE.

ESAU D. TAYLOR, OF HORNELLSVILLE, NEW YORK.

MANUFACTURE OF TRUNKS, &c.

SPECIFICATION forming part of Letters Patent No. 476,840, dated June 14, 1892.

Application filed August 26, 1891. Serial No. 403,813. (No model.)

*To all whom it may concern:*

Be it known that I, ESAU D. TAYLOR, a citizen of the United States, residing at Hornellsville, in the county of Steuben and State of New York, have invented certain new and useful Improvements in the Manufacture of Trunks, Boxes, Coverings, and other Articles; and I do declare the following to be a full, clear, and exact description of the invention, such as will enable others skilled in the art to which it appertains to make and use the same, reference being had to the accompanying drawings, and to the figures of reference marked thereon, which form a part of this specification.

It is the object of my invention to produce a trunk or box or other article adapted for use as a case or covering, in which various advantages—such as strength, durability, beauty of finish, and economy in manufacture—are attained.

By my invention I am able to use materials that are comparatively thin and of comparatively light weight, and nevertheless secure the necessary strength and rigidity in the finished article. These characteristics render the invention particularly useful in the manufacture of trunks, and I will proceed to describe it as so applied, though it will be understood that it is not limited to such use, but may be utilized in the production of other articles.

In order to make my improvements more clearly understood, I have shown in the accompanying drawings means for carrying them into practical effect without, however, intending to limit the invention to the particular details which, for the sake of illustration, I have set forth.

Figure 11:
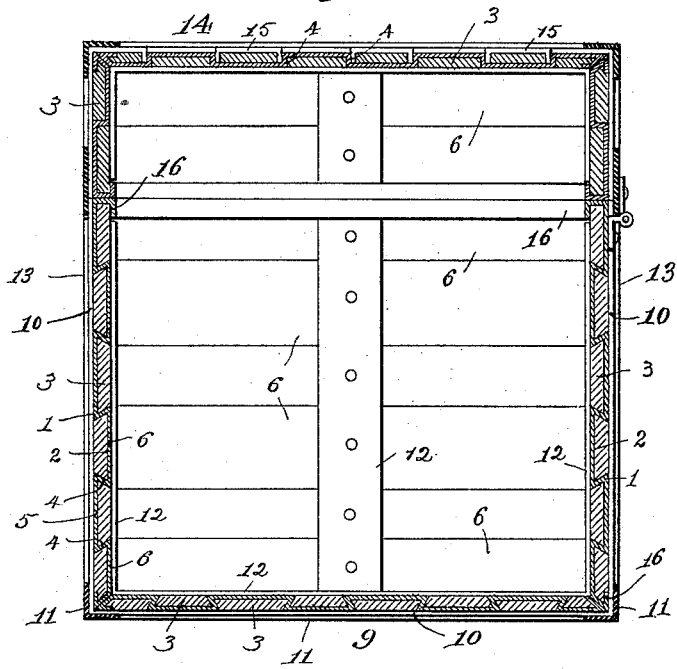
Figure 12:
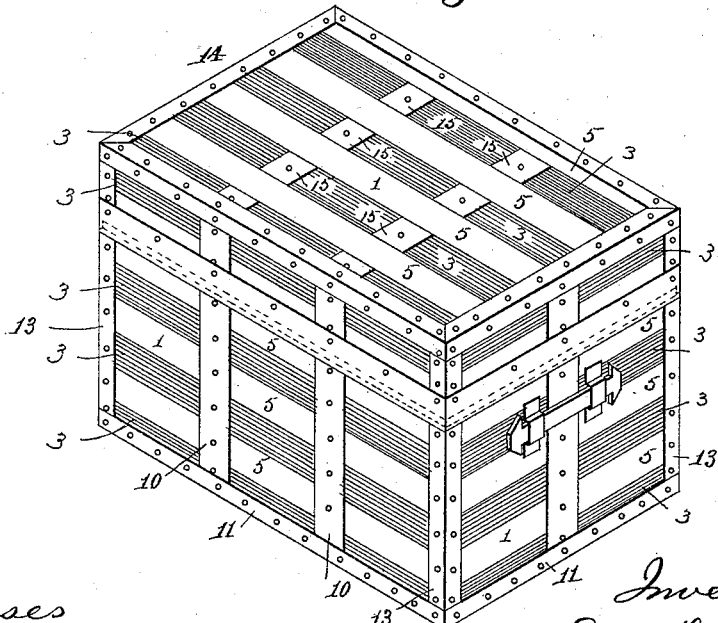

In said drawings, Figure 1 is a view of a sheet of flexible material — by "flexible" meaning to include a substance that can be bent, such as malleable metal, (tin, iron, copper, zinc, &c.,) or such as leather, rawhide, or other fibrous material. Fig. 2 is a view of the same formed with corrugations or recesses on both sides. Fig. 3 is a similar view of the sheet having stiffening-pieces—such as wood, paper board, &c.—in said recesses. Figs. 4, 5, and 6 show modified forms of the recesses or corrugations of the flexible sheet. Fig. 7 is a view of the sheet having portions of the stiffening-pieces removed. Fig. 8 is a view of the same bent to form the body of a trunk or box. Figs. 9 and 10 show other manners of removing said portions and bending the sheet. Fig. 11 is a sectional view of a trunk constructed according to my invention. Fig. 12 is a perspective view of the same.

Referring to the drawings, 1 indicates a sheet of flexible material bent or crimped by suitable means to form corrugations or recesses 2 upon opposite sides of the sheet, in which are stiffening-pieces 3. For the latter pieces wood is a suitable material. The corrugations may be plain, with the parts or walls 4, which connect the front portions 5 with the back portions 6 of the plate 1, at right angles to such portions, Fig. 4; or said corrugations may be undercut or dovetailed in shape, as shown in Fig. 2, the stiffening-pieces 3 having their edges similarly beveled. In this case the walls 4 will not be exactly but will be substantially at right angles to the outer faces of the parts 3, 5, and 6.

In Fig. 5 is shown a manner of forming the corrugations and stiffening-pieces, which is equivalent in effect to the dovetailed shape of Fig. 2 in maintaining the pieces 3 in place. I prefer to first bend the flexible sheet 1, as shown, and then introduce the stiffening-pieces into the recesses 2. Where the recesses are dovetailed or equivalently shaped, the pieces are introduced longitudinally. In the latter case the shape of the recesses 2 may be sufficient for the purpose of retaining the stiffening-pieces. In the case of such constructions as Fig. 4, and in fact in every instance, if desired, I employ an additional securing means, such as cement or rivets. The latter are indicated at 7 and can be inserted and secured by machines with the greatest rapidity and economy (as distinguished from applying rivets to a finished or partly-finished trunk) on account of the flat form of the combined parts 1 and 3. As another form of securing means for the pieces 3, I may cut the sheet 1 on lines transverse to the corrugations and bend the strips 8 thus partially severed from the sheet outward, as indicated in Fig. 6, so as to lie across the corrugations. The pieces 3 will then be introduced longitudinally into the corrugations beneath the strips 8. There is thus produced a composite sheet or board of any desired width and length, according to the dimensions of the trunk or trunks (or other article or articles) to be produced therefrom. This board can be made of highly-attractive appearance and is very strong and durable, the pieces 3 supporting rigidly the sheet 1 and the latter binding together and protecting the said pieces. The board is especially rigid on lines transverse to the parts 4, which separate the neighboring pieces 3 and pass from one side to the other of the board.

The next step in the manufacture of the article is to remove from the composite board, on that side which is to be the interior of the finished article, portions of the stiffening-pieces 3 on the lines where the angles of the article are to occur. This may be done by hand, but preferably by a machine having a suitable grooving or milling tool. In the latter case the composite board is fed through the machine in such manner that the tool will cut through and remove portions of the pieces 3, and also, where the angles of the article are to run crosswise of the corrugations of the sheet 1, will remove the parts 6 and 4 of the flexible sheet, leaving only the parts 5. When the angles of the finished article are to be parallel with the corrugations, Fig. 10, it is not necessary to cut or remove any part of the sheet 1. I prefer to make a V-shaped cut, as indicated in Fig. 7, producing a miter-joint, Fig. 8; but I may make a square cut and produce a joint of the kind shown in Fig. 9. The composite board is then bent on the lines along which portions of the pieces 3 have thus been removed to form the body of the trunk or other article, Fig. 8. It may then be finished in any suitable manner.

Referring to the form of finished articles shown in Figs. 11 and 12, 9 indicates the bottom fitted to the body and secured by bands 10, riveted to the bottom and body, and by angle 11 at the edges. 12 indicates interior bands, which may also be employed, if desired. 13 are vertical angle-pieces, which strengthen the corners of the trunk. A lid is shown at 14, which may be made in the same manner as the body or in any other desired way. It will be observed that the sides, bottom, and top of the trunk when made of my composite board offer great resistance to any external pressure by reason of the parts 4, which lie edgewise to such strain. When the corrugations are dovetailed, as shown in Figs. 2 and 11, such pressure causes the pieces 3 to be all the more tightly clamped by the parts 4, thus strengthening the article at the time when strength and rigidity are needed.

I do not confine myself to running the corrugations and pieces 3 in any particular direction relative to the edges and angles of the article to be produced. The pieces 3 may run parallel with the angles on which the sheet 1 is bent, Fig. 10, or they may run diagonally or at an acute angle to such angles or corners.

Instead of making the bands 10 continuous I may make them in sections 15, overlying only the faces of the outer or exposed pieces 3, as shown in the lid 14.

A different and better quality of material may be employed for the outer or exposed pieces 3, using a cheaper material for the pieces, which are exposed only on the inside of the trunk.

Rivets, solder, or clinched nails may be employed in securing together the different parts of the article, according to its grade or quality or according to the uses to which it is to be put.

At the edge of the composite board the sheet 1 is bent around the last piece 3 and lapped for a short distance over its inner surface, as shown at 16, Fig. 2.

What I claim is—

1. A trunk or analogous article having its walls formed of a series of stiffening-pieces, and a sheet of flexible material passing alternately from the outside to the inside of the wall and partly around said pieces and having the connecting portions 4 situated at substantially right angles to the faces of said walls, substantially as set forth.

2. A trunk or analogous article comprising a series of stiffening-pieces, a metallic sheet passing alternately over the inner and outer faces of said pieces, and transverse bands lying upon said pieces and sheet and connected therewith, substantially as set forth.

3. In a trunk or analogous article, the combination of a sheet of flexible material bent to form recesses or corrugations on its inner and outer sides and having connecting portions joining the outer and inner parts of the sheet, and stiffening-pieces situated in said recesses, said sheet being continuous from one face to another of the trunk, substantially as set forth.

4. The combination of a series of stiffening-pieces, a sheet of flexible material bent to receive said pieces alternately on its outer and inner faces and having the connecting portions 4 situated at substantially right angles to the faces of said walls, and securing means for holding said sheet and pieces together, substantially as set forth.

5. The combination of a series of stiffening-pieces, a sheet of flexible material bent to receive said pieces alternately on its outer and inner face, and transverse bands and rivets uniting said pieces and material, substantially as set forth.

6. The herein-described method of making trunks and other articles, consisting in forming a sheet of flexible material with alternate crimped portions or recesses on both of its sides and filling said recesses with stiffening-pieces, then removing portions of said pieces, and then bending the sheet to form the body of the article, substantially as set forth.

7. The herein-described method of making trunks and other articles, consisting in forming a sheet of separate stiffening-pieces and continuous flexible binding material which passes alternately in front of and behind said pieces, then securing together said pieces and material, then removing portions of the stiffening-pieces, and then bending the sheet, substantially as set forth.

8. The herein-described method of making trunks and other articles, consisting in forming a continuous flat sheet of stiffening-pieces, and flexible binding material which passes alternately in front of and behind said pieces, then securing together said pieces and material while said sheet is in a substantially flat form by rivets or nails, then removing portions of the stiffening-pieces on the lines where the angles of the finished article are to occur, and then bending the sheet on said lines to form the body of the article, substantially as set forth.

9. A trunk or analogous article having its walls formed of a series of stiffening-pieces, and a sheet of flexible material passing alternately from the outside to the inside of the wall and partly around said pieces and having the strips 8, substantially as set forth.

10. As an improved article of manufacture, a trunk having its walls formed of a series of stiffening-pieces, a sheet of flexible material which passes alternately from the inner to the outer side of the trunk and is bent to form recesses in which said pieces are seated, and pieces extending crosswise of said recesses and connected with the sheet, substantially as set forth.

In testimony whereof I affix my signature in presence of two witnesses.

ESAU D. TAYLOR.

Witnesses:
H. N. Low,
F. J. Benjamin.